US012712630B2

(12) United States Patent
Lekutai et al.

(10) Patent No.: US 12,712,630 B2
(45) Date of Patent: Aug. 18, 2026

(54) DYNAMIC RECONFIGURATION OF BANDWIDTH PARTS FOR TESTING CONNECTIVITY TO NON-TERRESTRIAL NETWORKS

(71) Applicant: T-Mobile USA, Inc., Bellevue, WA (US)

(72) Inventors: Gaviphat Lekutai, Kirkland, WA (US); Jonathan L. Xayasy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 289 days.

(21) Appl. No.: 18/651,442

(22) Filed: Apr. 30, 2024

(65) Prior Publication Data

US 2025/0337482 A1 Oct. 30, 2025

(51) Int. Cl.
*H04W 24/06* (2009.01)
*H04B 7/185* (2006.01)

(52) U.S. Cl.
CPC ........ *H04B 7/18519* (2013.01); *H04W 24/06* (2013.01)

(58) Field of Classification Search
CPC ... H04B 7/18519; H04W 24/06; H04W 24/08
See application file for complete search history.

(56) References Cited

U.S. PATENT DOCUMENTS 8,515,015 B2 8/2013 Maffre et al.
9,661,515 B2 5/2017 Lord et al.
9,774,618 B2 9/2017 Sundhar et al.
(Continued)

FOREIGN PATENT DOCUMENTS

CN 102355678 A 2/2012
CN 101978757 B 12/2013
(Continued)

OTHER PUBLICATIONS

Majamaa et al.; Multi-Connectivity for User Throughput Enhancement in 5G Non-Terrestrial Networks; 2022 18th International Conference on Wireless and Mobile Computing, Networking and Communications (WiMob); Oct. 10, 2022.*

*Primary Examiner* — Jay P Patel
(74) *Attorney, Agent, or Firm* — Ashurst Perkins Coie US LLP

(57) ABSTRACT

Systems and methods for configuring a testing environment to evaluate intermittent connections of multiple wireless devices to a non-terrestrial network (NTN). In some aspects, the system can configure the multiple wireless devices such that a first subset of the multiple wireless devices is assigned a first BWP and a second subset of the multiple wireless devices is assigned a second BWP different from the first BWP, perform a first test that evaluates connectivity to the NTN from the first and the second subsets of the multiple wireless devices, dynamically reconfigure the multiple wireless devices to assign new combinations of BWPs to third and fourth subsets of the multiple wireless devices, perform a second test that evaluates connectivity to the NTN from the third and the fourth subsets of the multiple wireless devices, and generate performance indicators based on the first and second tests that evaluate connectivity to the NTN.

20 Claims, 5 Drawing Sheets

(56) References Cited

U.S. PATENT DOCUMENTS

| | | | |
|---|---|---|---|
| 9,838,888 | B2 | 12/2017 | Lihosit et al. |
| 10,616,781 | B2 | 4/2020 | Mitchell et al. |
| 10,645,593 | B2 | 5/2020 | Barmettler et al. |
| 10,736,114 | B2 | 8/2020 | Dillon |
| 10,819,613 | B2 | 10/2020 | Chow et al. |
| 10,965,699 | B2 | 3/2021 | Hodgman |
| 11,057,865 | B1 | 7/2021 | Wong et al. |
| 11,089,495 | B2 | 8/2021 | Devarasetty |
| 11,363,497 | B2 | 6/2022 | Jeon et al. |
| 11,490,329 | B1 | 11/2022 | Artuso |
| 11,638,176 | B2 | 4/2023 | Gulati et al. |
| 11,838,826 | B1 * | 12/2023 | Chandrasekaran .......................... G01C 21/3867 |
| 11,886,767 | B2 | 1/2024 | Nguyen |
| 12,028,726 | B2 * | 7/2024 | Lekutai ................. H04W 24/10 |
| 2008/0232329 | A1 | 9/2008 | Jen |
| 2011/0282642 | A1 | 11/2011 | Kruger et al. |
| 2012/0094660 | A1 | 4/2012 | Radulescu et al. |
| 2014/0329557 | A1 | 11/2014 | Van Der Velde et al. |
| 2021/0167897 | A1 | 6/2021 | Seidel et al. |
| 2021/0337509 | A1 | 10/2021 | Selvanesan et al. |
| 2021/0345072 | A1 | 11/2021 | Selvanesan et al. |
| 2022/0217497 | A1 | 7/2022 | Ebrahim Rezagah et al. |
| 2022/0225292 | A1 | 7/2022 | Mohammad Soleymani et al. |
| 2022/0264523 | A1 | 8/2022 | Fehrenbach et al. |
| 2022/0295445 | A1 | 9/2022 | Göktepe et al. |
| 2022/0345202 | A1 | 10/2022 | Huang et al. |
| 2023/0082507 | A1 | 3/2023 | Mcmenamy et al. |
| 2023/0232382 | A1 | 7/2023 | Srinivasan et al. |
| 2023/0328522 | A1 | 10/2023 | Shah |
| 2023/0354412 | A1 | 11/2023 | Christoffersson et al. |
| 2023/0362583 | A1 | 11/2023 | Rahman |
| 2024/0032005 | A1 | 1/2024 | Srivastava |
| 2024/0394034 | A1 * | 11/2024 | Somashekar ............. G06F 8/65 |
| 2024/0397349 | A1 * | 11/2024 | Somashekar ....... H04L 41/0645 |
| 2024/0405897 | A1 * | 12/2024 | Somashekar ........... H04L 43/55 |

FOREIGN PATENT DOCUMENTS

| | | | |
|---|---|---|---|
| CN | 102668622 | B | 4/2015 |
| CN | 103002499 | B | 4/2015 |
| CN | 104782056 | A | 7/2015 |
| CN | 102972078 | B | 11/2015 |
| CN | 105392197 | A | 3/2016 |
| CN | 103181111 | B | 12/2016 |
| CN | 106465167 | A | 2/2017 |
| CN | 107770824 | A | 3/2018 |
| CN | 108476424 | A | 8/2018 |
| CN | 108811104 | A | 11/2018 |
| CN | 113261312 | A | 8/2021 |
| DE | 102016004256 | A1 | 10/2016 |
| DE | 112016004542 | T5 | 7/2018 |
| DE | 102020132897 | A1 | 12/2021 |
| EP | 1595192 | A2 | 11/2005 |
| EP | 3000267 | B1 | 7/2018 |
| EP | 2997679 | B1 | 8/2018 |
| EP | 3178271 | B1 | 11/2018 |
| EP | 2848044 | B1 | 11/2019 |
| EP | 3854161 | B1 | 2/2023 |
| JP | 2008515282 | A | 5/2008 |
| JP | 2008518528 | A | 5/2008 |
| JP | 2008278473 | A | 11/2008 |
| JP | 2012053868 | A | 3/2012 |
| JP | 5133869 | B2 | 11/2012 |
| JP | 2015530779 | A | 10/2015 |
| JP | 6397138 | B2 | 9/2018 |
| KR | 101317288 | B1 | 10/2013 |
| WO | 2012041106 | A1 | 4/2012 |
| WO | 2014069748 | A1 | 5/2014 |
| WO | 2014176503 | A1 | 10/2014 |
| WO | 2016127688 | A1 | 8/2016 |
| WO | 2019029668 | A1 | 2/2019 |
| WO | 2020089317 | A1 | 5/2020 |
| WO | 2020144261 | A1 | 7/2020 |
| WO | 2021013811 | A1 | 1/2021 |
| WO | 2021160495 | A1 | 8/2021 |
| WO | 2022003031 | A1 | 1/2022 |
| WO | 2022258217 | A1 | 12/2022 |

* cited by examiner

DYNAMIC RECONFIGURATION OF BANDWIDTH PARTS FOR TESTING CONNECTIVITY TO NON-TERRESTRIAL NETWORKS

BACKGROUND

Non-terrestrial networks (NTN) are wireless communications systems that operate above the Earth's surface, involving satellites at low Earth orbit (LEO), medium Earth orbit (MEO), and geostationary orbit (GEO), high-altitude platform stations (HAPS), and drones. Such components are essential to realizing seamless coverage, bringing coverage even to remote areas that do not have access to traditional terrestrial networks.

BRIEF DESCRIPTION OF THE DRAWINGS

Detailed descriptions of implementations of the present invention will be described and explained through the use of the accompanying drawings.

Figure 1:
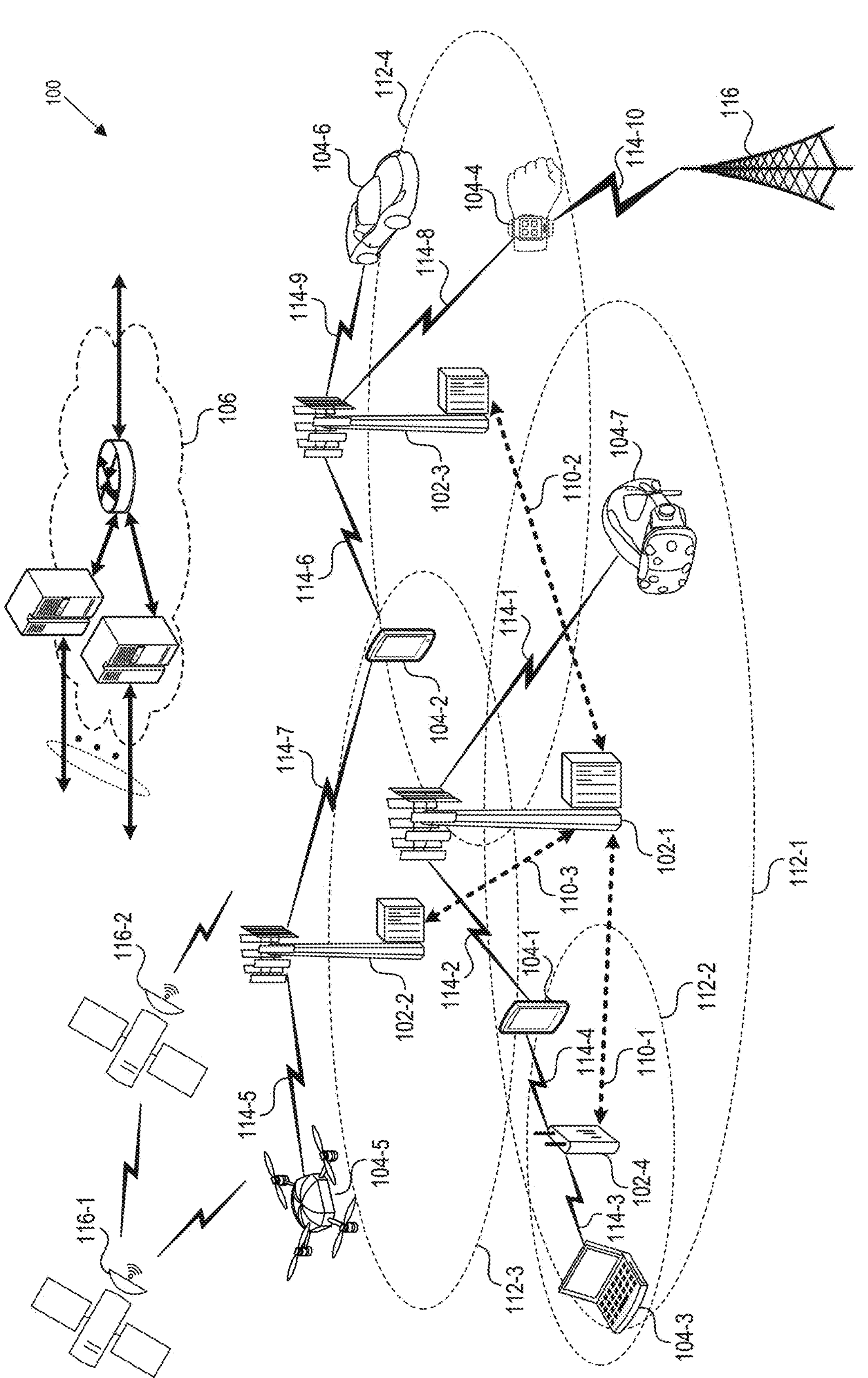
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology solves the technical challenges faced by telecommunications service providers to test the management of bandwidth parts (BWP) of user equipment (UE) devices connecting to non-terrestrial networks (NTN). As used herein, a "bandwidth part" can be a subset of the total available network bandwidth allocated to a specific UE device or group of UE devices based on their specific device requirements. For example, a 5G telecommunications network can be configured with two BWPs such that one BWP allocates a high bandwidth for UE devices that require a high data rate, while the other BWP allocates a low bandwidth for UE devices that require a low data rate.

The disclosed technology automatically manages BWPs of UE devices of a telecommunications network testing environment ("system," "testing system," or "bandwidth management system"). The disclosed system automatically configures BWPs of UE devices in a network testing environment. The network testing environment, for example, can include groups of UE devices connected or attempting to connect to an NTN, such as an orbiting satellite. To configure the BWPs for each UE device, the system receives configuration parameters from the network testing environment. The configuration parameters can include, for example, a set of BWP assignment options available for the UE device, where each BWP assignment option corresponds to a unique bandwidth range for the UE device to communicate with the NTN in the testing environment. Using the available set of BWP assignment options, the system can designate a specific BWP to the UE device. As a result, the system configures the UE device to communicate with the NTN at the specific bandwidth range associated with the assigned BWP. In these and other implementations, the system can monitor communication activity between the UE device and the NTN at the assigned BWP to evaluate performance indicators of the connection between the UE device and the NTN in the testing environment. The performance indicators can indicate, for example, that the BWP configuration of the UE device establishes a stable and quality connection with the NTN in the testing environment.

In contrast, existing test systems typically use manual processes for configuring and/or reconfiguring BWPs for each UE device, which can be time inefficient and disadvantageous for effectively testing UE device connection to NTN networks. For example, network coverage of an NTN (e.g., an orbiting satellite) typically has a limited duration (e.g., few minutes each day) within which UE devices can connect to the network. As a result, the time inefficiency (e.g., time to configure each UE device) caused by manual configuration of BWP for UE devices results in shorter time windows for UE devices to connect to the network and thus less time to test and evaluate UE device connections to the NTN.

The foregoing problems are compounded as modern telecommunications network services (e.g., 5G telecommunications) and UE devices enable more varieties of bandwidth connection options, resulting in complex BWP configurations between UE devices and NTNs. Thus, these and other problems can cause great difficulty in testing BWP connections between UE devices and NTNs, which can negatively impact telecommunications service providers, developers, employees, subscribers, third-party services, and so forth. Accordingly, the disclosed technologies overcome the foregoing problems and provide additional benefits. For example, the disclosed testing system automatically configures UE devices to a specified BWP without manual intervention to improve time efficiency. Additionally, the system can coordinate configuration of multiple UE devices to specified BWPs within a short duration of time.

In some implementations, the testing system can dynamically change the assigned BWPs of multiple UE devices. For example, the disclosed system can be used to change the assigned BWP of one or more UE devices within the testing environment at a scheduled time. As a result, the disclosed system can simulate realistic connections, changes in BWP, or disconnections of a UE device from an NTN. Additionally, or alternatively, the disclosed system can synchronize changes in BWPs for multiple UE devices simultaneously in real time to enable the testing environment to efficiently simulate a variety of UE device connection scenarios. In some implementations, the disclosed system can receive a schedule for assigning new BWPs to specified UE devices at different times, which can enable the testing environment to simulate subtle connection behaviors between UE devices and an NTN.

Advantages of the disclosed technology include improved ability to manage BWPs of UEs of a telecommunications testing environment, such as by assigning BWPs to UE devices in real time. As a result, the disclosed technology can take advantage of the reduced assignment time to configure large quantities of UE devices within the limited connection time with the NTN. Similarly, the disclosed technology can use the reduced assignment time to conduct more performance evaluations on the UE devices within the testing environment. Furthermore, the disclosed technology enables the testing environment to simulate real-time connections of UE devices to an NTN, thus providing more realistic performance data and evaluations.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wirelessterm device 104 can operatively couple to a base station 102 over a long-term evolution/long-evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
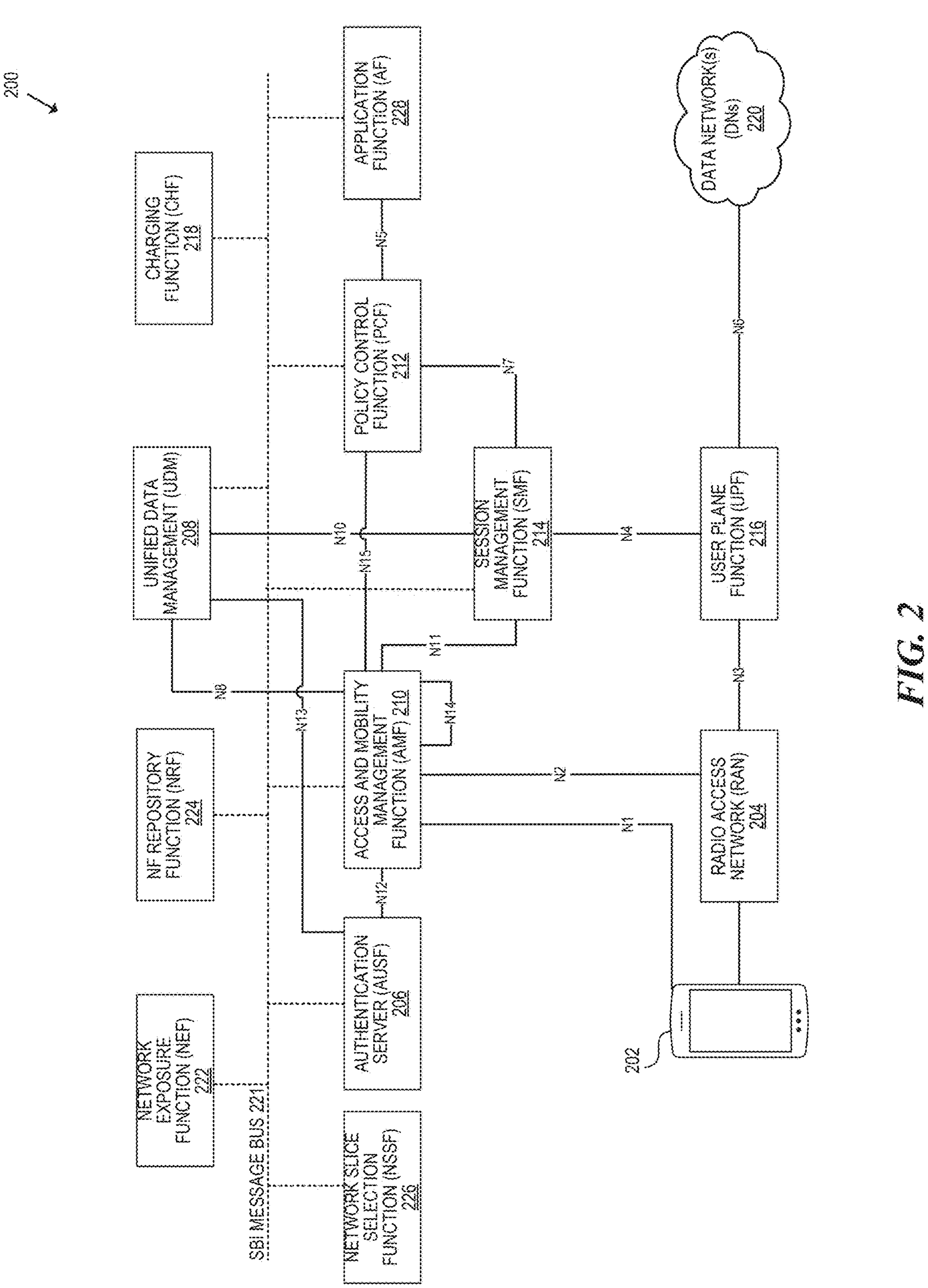
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Bandwidth Testing Environment

Figure 3:
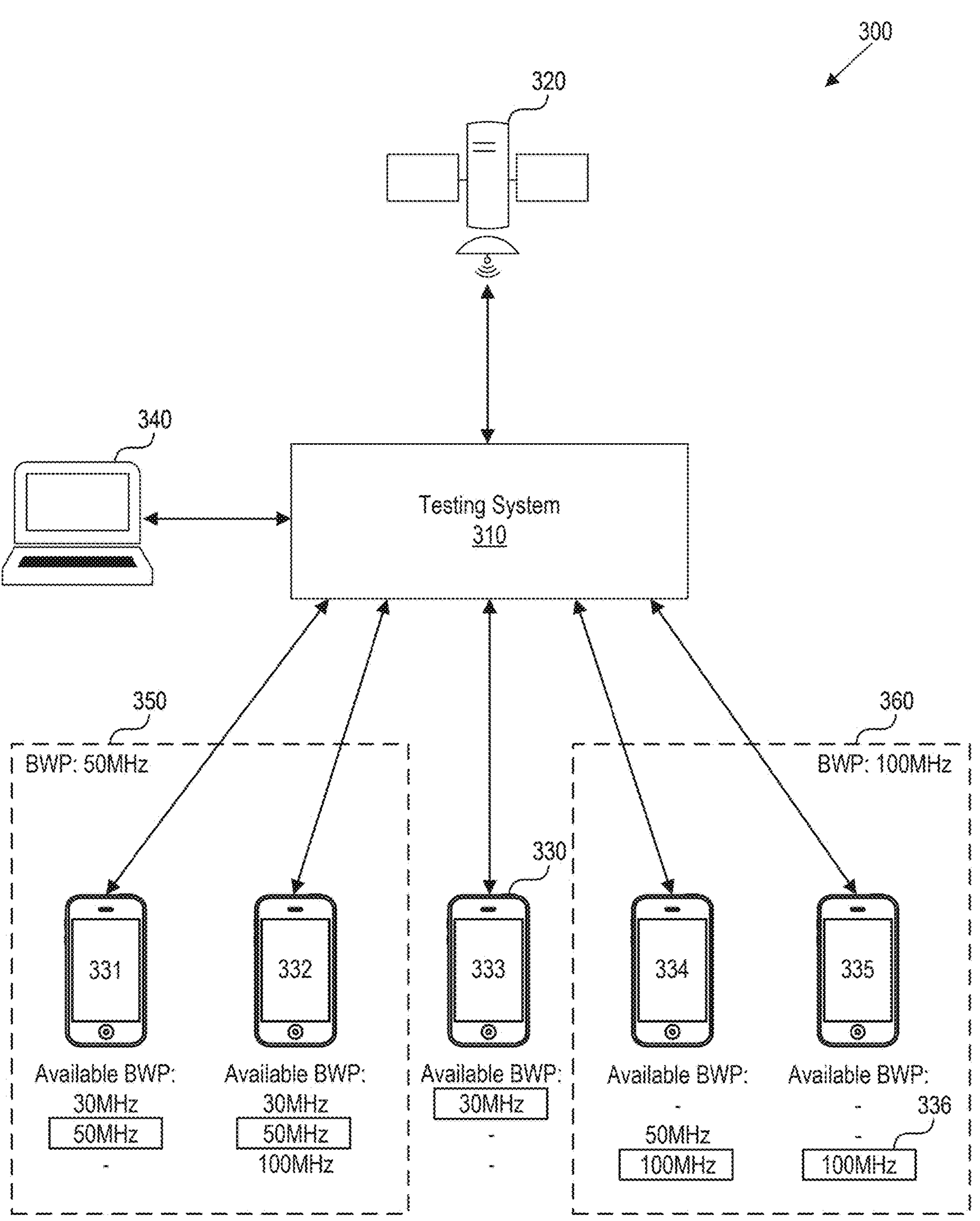
FIG. 3 is a block diagram that illustrates components of a bandwidth testing environment in some implementations.

FIG. 3 is a block diagram that illustrates components of a bandwidth testing environment 300 in some implementations. The environment 300 includes a testing system 310, a testing NTN 320, one or more wireless devices 330, and a user interface 340, which are each discussed in further detail below. All or portions of the system 300 can be provided, for example, by a telecommunications service provider that provides all or portions of the testing NTN 320 using one or more components of the network 100.

To evaluate connection performance (e.g., stability and/or quality) of wireless devices 350 to NTNs, the testing environment 300 includes a testing system 310, via which wireless devices 350 can connect to a testing NTN 320 at one of multiple different BWPs. The testing system 310 can be implemented with a combination of software (e.g., executable instructions or computer code) and hardware (e.g., one or more memories and one or more processors). Accordingly, as used herein, in some examples the testing system 310 represents a computing device having one or more processors that are at least temporarily configured and/or programmed by executable instructions carried in one or more memories to perform one or more of the functions described herein.

In some embodiments, the testing system 310 can assign a BWP to each wireless device 350 within the bandwidth testing environment 300. For example, system 310 can assign a selected BWP 336 from a set of available BWPs for a wireless device 350. As shown in FIG. 3, each wireless device 330 of the testing environment 300 includes at least one available BWP for connecting to the testing system 310. As such, system 310 can assign unique combinations of BWPs for the set of wireless devices 331, 332, 333, 334, 335 within the testing environment 300 based on the available BWPs of each wireless device 330. In additional or alternative embodiments, the system 310 can automatically configure each wireless device 330 in the testing environment 300 to an assigned BWP 336 in real time. For example, the system 310 can receive a configuration request to assign a target wireless device 330 to a specified BWP 336. In response to receiving the configuration request, the system 310 can configure the target wireless device 330 to the specified BWP 336 within a short time duration.

In some embodiments, system 310 can use a predetermined assignment pattern to configure wireless devices 330 of the testing environment 300. For example, the system 310 can configure the BWPs of wireless devices 330 based on a mapping between each wireless device 330 and an assigned BWP 336. As depicted in FIG. 3, an example scenario can involve a mapping between multiple wireless devices 331, 332, 333, 334, 335 and selected BWPs 336 for each wireless device 331, 332, 333, 334, 335. In additional or alternative embodiments, the predetermined assignment pattern can include a timestamp component for each assignment entry that requires configuration of wireless devices 330 to assigned BWPs 336 at a specified time (e.g., a time delay). For example, the system 310 can configure a first wireless device 330 at a first timestamp and configure a second wireless device 330 at a second timestamp that is some time after the first timestamp. By using timestamps to schedule automatic BWP assignments, system 310 enables precise configuration of time-based connection scenarios between wireless devices 330 and the testing NTN 320.

In some embodiments, system 310 can assign multiple wireless devices 330 based on a single BWP assignment. For example, system 310 can receive an assigned BWP 336 for a plurality of wireless devices 330 combined into an assignment group. As shown in FIG. 3, system 310 can configure wireless devices 331, 332 of an assignment group of wireless devices 350 to an assigned BWP 336 (e.g., 50 MHZ). Further, as shown in FIG. 3, wireless devices 334, 335 within an assignment group 360 each have the assigned BWP 336 (e.g., 100 MHZ) as an available BWP configuration. In additional or alternative embodiments, the system 310 can reconfigure wireless devices 330 of the testing environment 300 to new combinations of assigned BWPs for the wireless devices 330. For example, system 310 can reconfigure the wireless devices 330 based on a mapping between one or more wireless devices 330 of the testing environment 300 and new assigned BWPs. As discussed herein, the system 310 can similarly reconfigure the one or more wireless devices 330 in real time or based on a time-based assignment schedule. In some embodiments, the system 310 can perform a maximum number of BWP assignments for wireless devices 330 based on a threshold time duration corresponding to a connection availability of the testing NTN 320.

In some embodiments, system 310 can receive simultaneous BWP assignments and subsequently configure the corresponding wireless devices 330 at different times. For example, the system 310 can receive a predetermined assignment schedule for a set of wireless devices 330, where each wireless device 330 has an assigned BWP 336 to be configured at a specified timestamp. As such, system 310 can receive the predetermined assignments for the set of wireless devices 330 at the same time and subsequently implement the configuration of the assigned BWP 336 for each wireless device 330 at the corresponding timestamp. In additional or alternative embodiments, system 310 can receive disjointed BWP assignments (e.g., at different timestamps) and subsequently synchronize the configuration of corresponding wireless devices 330 at the same time. For example, the system 310 can receive a first assignment request for configuring a first wireless device to a first assigned BWP at a target timestamp and a second assignment request for configuring a second wireless device to a second assigned BWP at the same target timestamp, where the first and the second assignment requests were received by the system 310 at different times. As such, system 310 can receive the predetermined assignments for the first and the second wireless devices at different times and subsequently synchronize the configuration of both the first and the second wireless devices at the same target timestamp.

In some embodiments, system 310 can enable connection between a wireless device 330 with the testing NTN 320. For example, the system 310 can scan for properties of each wireless device 330 (e.g., an assigned BWP) to determine a proper bandwidth frequency range (e.g., iPerf bandwidth) to connect the wireless device 330 to the testing NTN 320. In additional or alternative embodiments, the system 310 can actively monitor the established connection between a wireless device 330 and the testing NTN 320 in real time to measure one or more performance indicators (e.g., device connection state, communication throughput, latency, modulation and coding schemes (MCS), mean opinion score (MOS), signal to interference and noise ratio (SINR) levels, and other related telecommunications service performance metrics) representative of a stable NTN connection. In other embodiments, the system 310 can perform a test that evaluates connectivity of wireless device 330 to the testing NTN 320 based on the measured performance indicators. For example, the system 310 can assess whether the measured performance indicators exceed a set of performance thresholds representative of a stable and/or quality connection with the testing NTN 320.

In additional, or alternative embodiments, the system 310 can perform an iterative calibration test to determine connectivity limitations of BWPs for a wireless device 330. For example, the system 310 can perform a closed loop automation to iteratively increase (or decrease) the active BWP (e.g., bandwidth range) used to connect with the wireless device 330 until the connection fails to meet specified thresholds (e.g., device connection state, communication throughput, and the like). The system 310 can begin the closed loop automation by attempting to establish a connection to the wireless device 330 at a baseline BWP. In response to a successful connection that fulfills the specified thresholds, the system 310 can attempt to establish a new connection to the wireless device 330 at a new BWP that has an increased (or decreased) bandwidth range compared to the baseline BWP. In response to a failed connection that is unable to fulfill all thresholds of the specified thresholds, the system 310 can record the previous BWP used to establish a successful connection as the maximum (or minimum) viable BWP for the wireless device 330. In some embodiments, the closed loop automation can be performed to evaluate connectivity limitations of BWPs for a plurality of wireless devices 330 simultaneously.

The testing environment 300 includes a testing NTN 320 with which wireless devices 330 within the environment 300 can connect to via the testing system 310 at one of multiple different BWPs. In some embodiments, the testing NTN 320 can be a live NTN (e.g., an orbiting satellite) that demonstrates intermittent availability for connecting to wireless devices 330. For example, the testing NTN 320 can be a physical satellite that exhibits temporary connection visibility (e.g., wireless device 330 can connect to an NTN) for a short period of time within each day. In additional or alternative embodiments, the testing NTN 320 can be a simulated NTN, such as a software program configured to simulate intermittent availabilities and connection behaviors of real-world NTNs. As such, system 310 can use the simulated NTN to perform connectivity tests for wireless devices 330 independent of physical limitations (e.g., waiting for the satellite to return within visibility range) tied to live NTNs. Furthermore, simulated NTNs enable system 310 to test variations of connection scenarios, such as different availability durations (e.g., extended/shortened visibility window) and load capacities for connecting to multiple wireless devices 330 at specified bandwidth ranges.

The testing environment 300 includes wireless devices 330 that testing system 310 can configure to connect to the testing NTN 320 at specified BWPs. As shown in FIG. 3, a wireless device 330 can have one or more available BWPs for connecting to the testing NTN 320 that is based on the specific hardware capabilities (e.g., 5G components) of the wireless device 330. For instance, an old wireless device 331 can have two available BWP options (e.g., 30 MHz and 50 MHz) whereas a new wireless device 332 with more advanced hardware can have an additional BWP option (e.g., 100 MHz) not available to the old wireless device 331. In other embodiments, wireless devices 333, 335 with limited hardware (e.g., minimum hardware for one BWP) can have a single available BWP option. In additional or alternative embodiments, a wireless device 330 can simulate different available BWP options within the testing environment 300 regardless of original hardware limitations of the wireless device 330. In other embodiments, a wireless device 330 can implement a single BWP at a given point in time to connect to the testing NTN 320 as shown in FIG. 3. Furthermore, a wireless device 330 can transmit device properties (e.g., configured BWP) via system information block (SIB) messages to the testing system 310.

The testing environment 300 includes user interface 340 that enables users to perform various functions of the testing system 310. For example, the user interface 340 enables users to submit BWP assignment requests to the testing system 310 for automatically configuring wireless devices 330 to selected BWPs 336. In some embodiments, the user interface 340 can present to an end user a set of available BWP assignment options for each wireless device 330 within the testing environment 300. In response to a user selection of BWP assignment options, the user interface 340 can transmit a mapping between the wireless devices 330 of the testing environment 300 to the user selected BWPs 336. In additional or alternative embodiments, the user interface 340 can enable end users to specify a time for configuring one or more wireless devices 330 to selected BWPs 336. For example, in response to user selection of assigned BWPs 336 and configuration times for wireless devices 331-335, the user interface 340 can submit a schedule for automatic BWP assignments to the testing system 310. In additional or alternative embodiments, the user interface 340 can display real-time performance measures and/or indicators of connection performance (e.g., stability and/or quality) between wireless devices 330 and the testing NTN 320 across different tests. In other embodiments, the user interface 340 enables end users to instantiate a custom testing environment 300. For example, the user interface 340 can receive an environment setup configuration to use a simulated NTN (e.g., instead of a live NTN) as the testing NTN 320.

Figure 4:
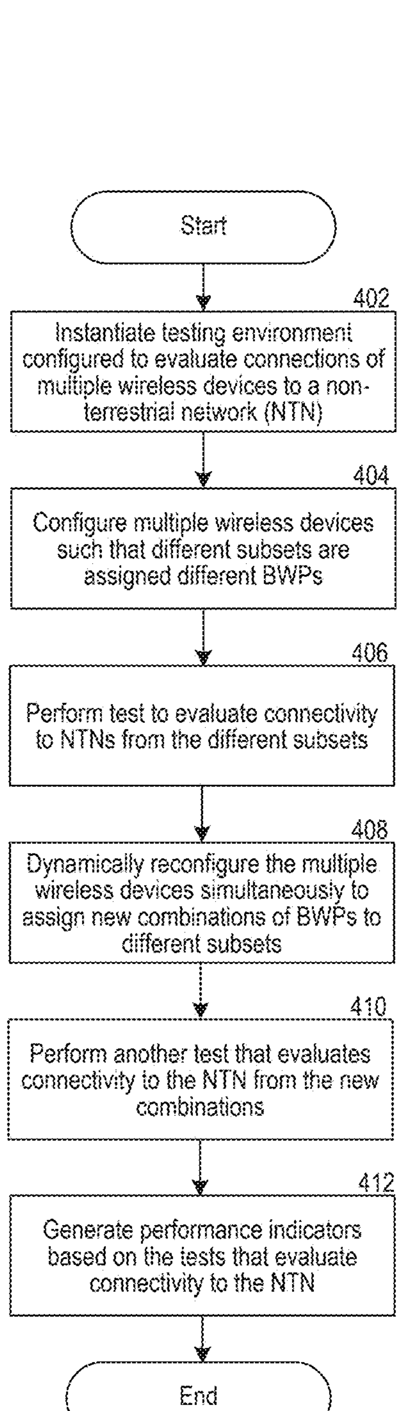
FIG. 4 is a flow diagram that illustrates a process to configure a testing environment in some implementations.

FIG. 4 is a flow diagram that illustrates a process to configure a testing environment in some implementations. In an example, a testing system includes at least one hardware processor and at least one non-transitory memory storing instructions, which, when executed by the at least one hardware processor, cause the testing system to perform the process 400.

At 402, the system can instantiate a testing environment configured to evaluate connections of multiple wireless devices to an NTN. The multiple wireless devices each implement one of multiple different BWPs at any point in time. In one example, the system can configure a live NTN for connecting to the multiple wireless devices of the testing environment. As such, the live NTN has intermittent availability for connecting to the multiple wireless devices based on real-world environmental conditions. In another example, the system can configure a simulated NTN for connecting to the multiple wireless devices of the testing environment. As such, the simulated NTN replicates intermittent availability of live NTNs for connecting to the multiple wireless devices.

At 404, the system can configure the multiple wireless devices such that a first subset of the multiple wireless devices is assigned a first BWP and a second subset of the multiple wireless devices is assigned a second BWP different from the first BWP.

At 406, the system can perform a first test that evaluates connectivity to the NTN from the first subset of the multiple wireless devices assigned the first BWP and the second subset of the multiple wireless devices assigned the second BWP. In one example, the system can scan the multiple wireless devices for an SIB message to determine each particular BWP. In the example, the performance indicators are determined based in part on the information contained in SIB messages of the wireless devices.

At 408, the system can dynamically reconfigure the multiple wireless devices simultaneously to assign new combinations of BWPs to third and fourth subsets of the multiple wireless devices. The third and fourth subsets can be different from the first and second subsets of the multiple wireless devices. The system can be further configured to receive a schedule configured to assign BWPs to specified wireless devices at different times. As such, the system can dynamically change assigned BWPs of the multiple wireless devices in accordance with the schedule to evaluate a sequence of connections to the NTN, changes in BWP, and disconnections from the NTN.

At 410, the system can perform a second test that evaluates connectivity to the NTN from the third subset of the multiple wireless devices assigned the third BWP and the fourth subset of the multiple wireless devices assigned a fourth BWP.

At 412, the system can generate performance indicators based on the first and second tests that evaluate connectivity to the NTN. The system can further synchronize changes in BWPs assigned to the multiple wireless devices simultaneously and in real time to enable testing a variety of BWP assignments to the multiple wireless devices within a threshold time that is based on available connectivity to the NTN.

Computer System

Figure 5:
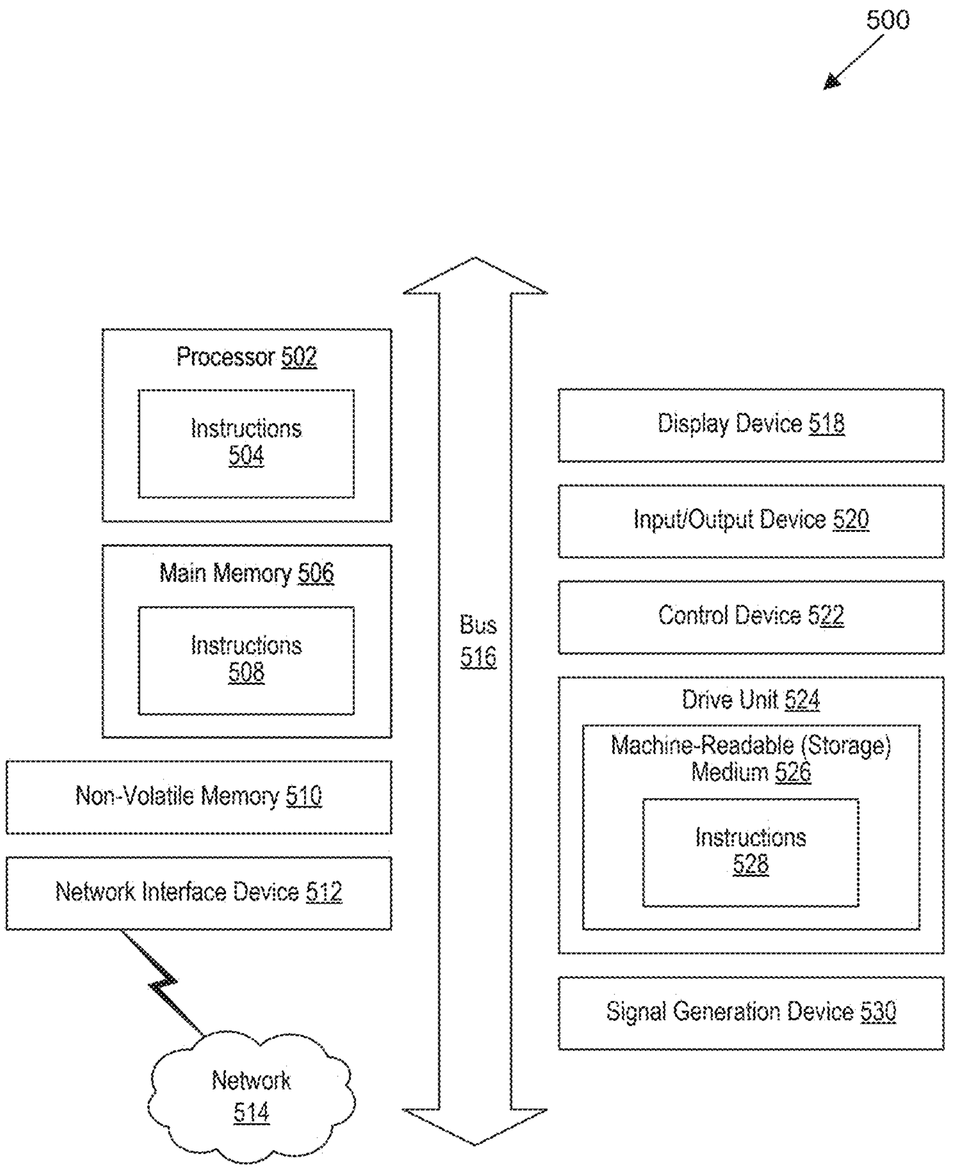
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A testing system comprising:
at least one hardware processor; and
at least one non-transitory memory storing instructions, which, when executed by the at least one hardware processor, cause the testing system to:
instantiate a testing environment configured to evaluate connections of multiple wireless devices to a non-terrestrial network (NTN),
wherein the multiple wireless devices each implement one of multiple different bandwidth parts (BWPs) at any point in time;
configure the multiple wireless devices such that a first subset of the multiple wireless devices is assigned a first BWP and a second subset of the multiple wireless devices is assigned a second BWP different from the first BWP;
perform a first test that evaluates connectivity to the NTN from the first subset of the multiple wireless devices assigned the first BWP and the second subset of the multiple wireless devices assigned the second BWP;
dynamically reconfigure the multiple wireless devices simultaneously to assign new combinations of BWPs to a third subset and a fourth subset of the multiple wireless devices,
wherein the third and fourth subsets are different from the first and second subsets of the multiple wireless devices;
perform a second test that evaluates connectivity to the NTN from the third subset of the multiple wireless devices assigned a third BWP and the fourth subset of the multiple wireless devices assigned a fourth BWP; and
generate performance indicators based on the first and second tests that evaluate connectivity to the NTN.

2. The testing system of claim 1, wherein to instantiate the testing environment comprises causing the testing system to:
configure a live NTN for connecting to the multiple wireless devices of the testing environment,
wherein the live NTN has intermittent availability for connecting to the multiple wireless devices based on real-world environmental conditions.

3. The testing system of claim 1, wherein to instantiate the testing environment comprises causing the testing system to:
configure a simulated NTN for connecting to the multiple wireless devices of the testing environment,
wherein the simulated NTN replicates intermittent availability of live NTNs for connecting to the multiple wireless devices.

4. The testing system of claim 1, wherein to perform the first or the second test comprises causing the testing system to:
scan the multiple wireless devices for a system information block (SIB) message to determine each particular BWP,
wherein the performance indicators are determined based in part on the information contained in SIB messages of the wireless devices.

5. The testing system of claim 1, wherein to dynamically reconfigure the multiple wireless devices simultaneously comprises causing the system to:
receive configuration parameters for the multiple wireless devices,
wherein the configuration parameters include a set of BWP assignment options available to each wireless device, including a bandwidth range for the wireless device to communicate with the NTN.

6. The testing system of claim 1 further caused to:
monitor communication activity between the multiple wireless devices at assigned BWPs and the NTN in real time to evaluate particular performance indicators of connections between the multiple wireless devices and the NTN,
wherein the particular performance indicators are indicative of a measure of stability and quality of connections with the NTN.

7. The testing system of claim 1, wherein to dynamically reconfigure the multiple wireless devices simultaneously comprises causing the system to:
assign a third BWP to the third subset of the multiple wireless devices; and
assign a fourth BWP to the fourth subset of the multiple wireless devices,
wherein the third subset and fourth subset each include at least some wireless devices from the first and the second subsets.

8. The testing system of claim 1 further caused to:
receive a schedule configured to assign BWPs to specified wireless devices at different times; and
dynamically change assigned BWPs of the multiple wireless devices in accordance with the schedule to evaluate a sequence of connections to the NTN, changes in BWP, and disconnections from the NTN.

9. The testing system of claim 1 further caused to:
synchronize changes in BWPs assigned to the multiple wireless devices simultaneously and in real time to enable testing a variety of BWP assignments to the multiple wireless devices within a threshold time that is based on available connectivity to the NTN.

10. A non-transitory, computer-readable storage medium comprising instructions recorded thereon, wherein the instructions, when executed by at least one data processor of a system, cause the system to:
instantiate a testing environment configured to evaluate intermittent connections of multiple wireless devices to a non-terrestrial network (NTN),
wherein the multiple wireless devices each implement one of multiple different bandwidth parts (BWPs) at any point in time;
configure the multiple wireless devices such that a first subset of the multiple wireless devices is assigned a first BWP and a second subset of the multiple wireless devices is assigned a second BWP different from the first BWP;
perform a first test that evaluates connectivity to the NTN from the first subset of the multiple wireless devices assigned the first BWP and the second subset of the multiple wireless devices assigned the second BWP;
dynamically reconfigure the multiple wireless devices to assign new combinations of BWPs to a third subset and a fourth subset of the multiple wireless devices,
wherein the third and fourth subsets are different from the first and second subsets of the multiple wireless devices;

perform a second test that evaluates connectivity to the NTN from the third subset of the multiple wireless devices assigned a third BWP and the fourth subset of the multiple wireless devices assigned a fourth BWP; and generate performance indicators based on the first and second tests that evaluate connectivity to the NTN.

11. The non-transitory, computer-readable storage medium of claim 10, wherein to dynamically reconfigure the multiple wireless devices comprises the instructions further causing the system to:

receive configuration parameters for the multiple wireless devices, wherein the configuration parameters include a set of BWP assignment options available to each wireless device, including a bandwidth range for the wireless device to communicate with the NTN.

12. The non-transitory, computer-readable storage medium of claim 10, wherein the instructions further cause the system to:

monitor communication activity between the multiple wireless devices at assigned BWPs and the NTN in real time to evaluate particular performance indicators of connections between the multiple wireless devices and the NTN, wherein the particular performance indicators are indicative of a measure of stability and quality of connections with the NTN.

13. The non-transitory, computer-readable storage medium of claim 10, wherein to dynamically reconfigure the multiple wireless devices comprises the instructions further causing the system to:

assign a third BWP to the third subset of the multiple wireless devices; and assign a fourth BWP to the fourth subset of the multiple wireless devices, wherein the third subset and fourth subset each include at least some wireless devices from the first and the second subsets.

14. The non-transitory, computer-readable storage medium of claim 10, wherein the instructions further cause the system to:

receive a schedule configured to assign BWPs to specified wireless devices at different times; and dynamically change assigned BWPs of the multiple wireless devices in accordance with the schedule to evaluate a sequence of connections to the NTN, changes in BWP, and disconnections from the NTN.

15. The non-transitory, computer-readable storage medium of claim 10, wherein the instructions further cause the system to:

synchronize changes in BWPs assigned to the multiple wireless devices simultaneously and in real time to enable testing a variety of BWP assignments to the multiple wireless devices within a threshold time that is based on available connectivity to the NTN.

16. A method performed by a testing system, the method comprising:

instantiating a testing environment configured to evaluate intermittent connections for a set of wireless devices to a non-terrestrial network (NTN), wherein each wireless device in the set of wireless devices implements one of multiple different bandwidth parts (BWPs) at any point in time;

configuring the set of wireless devices such that a first subset of wireless devices from the set of wireless devices is assigned a first BWP;

performing a first test that evaluates connectivity to the NTN from the first subset of wireless devices assigned the first BWP;

dynamically reconfiguring the set of wireless devices to assign a second BWP different from the first BWP to a second subset of wireless devices from the set of wireless devices, wherein the second subset is different from the first subset of wireless devices;

performing a second test that evaluates connectivity to the NTN from the second subset of wireless devices assigned the second BWP; and generating performance indicators based on the first and second tests that evaluate connectivity to the NTN.

17. The method performed by the testing system of claim 16, wherein dynamically reconfiguring the set of wireless devices further comprises:

receiving configuration parameters for the set of wireless devices, wherein the configuration parameters include a set of BWP assignment options available to each wireless device, including a bandwidth range for the wireless device to communicate with the NTN.

18. The method performed by the testing system of claim 16, the method further comprising:

monitoring communication activity between the set of wireless devices at assigned BWPs and the NTN in real time to evaluate particular performance indicators of connections between the set of wireless devices and the NTN, wherein the particular performance indicators are indicative of a measure of stability and quality of connections with the NTN.

19. The method performed by the testing system of claim 16, the method further comprising:

receiving a schedule configured to assign BWPs to specified wireless devices at different times; and dynamically changing assigned BWPs of the set of wireless devices in accordance with the schedule to evaluate a sequence of connections to the NTN, changes in BWP, and disconnections from the NTN.

20. The method performed by the testing system of claim 16, the method further comprising:

synchronizing changes in BWPs assigned to the set of wireless devices simultaneously and in real time to enable testing a variety of BWP assignments to the set of wireless devices within a threshold time that is based on available connectivity to the NTN.

* * * * *